US007494060B2

(12) United States Patent
Zagami

(10) Patent No.: US 7,494,060 B2
(45) Date of Patent: Feb. 24, 2009

(54) INFORMATION-BASED ACCESS CONTROL SYSTEM FOR SEA PORT TERMINALS

(76) Inventor: Anthony Zagami, 123 Renaissance Cir., Jupiter, FL (US) 33458

(*) Notice: Subject to any disclaimer, the term of this patent is extended or adjusted under 35 U.S.C. 154(b) by 1177 days.

(21) Appl. No.: 10/732,168

(22) Filed: Dec. 10, 2003

(65) Prior Publication Data

US 2005/0171787 A1 Aug. 4, 2005

(51) Int. Cl.
*G06K 5/00* (2006.01)

(52) U.S. Cl. ........................................ 235/382; 235/380

(58) Field of Classification Search ................. 235/382, 235/375, 383, 384, 382.5, 380, 492, 493, 235/487; 705/1, 5; 340/5.82, 5.74, 573.1
See application file for complete search history.

(56) References Cited

U.S. PATENT DOCUMENTS 5,657,389 A 8/1997 Houvener
6,038,333 A 3/2000 Wang
6,075,455 A 6/2000 DiMaria et al.
6,394,356 B1 5/2002 Zagami
6,959,874 B2 * 11/2005 Bardwell .................... 235/493
7,109,869 B2 * 9/2006 Sweatte .................. 340/573.1
2002/0196963 A1 * 12/2002 Bardwell .................... 382/124
2003/0055689 A1 * 3/2003 Block et al. ..................... 705/5
2003/0214407 A1 * 11/2003 Sweatte .................. 340/573.1
2005/0001711 A1 * 1/2005 Doughty et al. ............ 340/5.74
2005/0171787 A1 * 8/2005 Zagami ......................... 705/1
2006/0184801 A1 * 8/2006 Wood et al. ................. 713/186
2006/0243796 A1 * 11/2006 Macklin et al. ............. 235/382
2006/0243799 A1 * 11/2006 Kelly et al. ................. 235/384
2006/0279422 A1 * 12/2006 Sweatte ................ 340/539.13
2007/0119924 A1 * 5/2007 Register et al. ............. 235/380
2007/0271596 A1 * 11/2007 Boubion et al. ................ 726/3

* cited by examiner

*Primary Examiner*—Thien M Le

(57) ABSTRACT

An information based access control system for sea port terminals having security checkpoints. A database is associated with the processor, either locally on site, or at a central location where it is accessible from a plurality of sea ports. The checkpoints can include a smart card reader, biometric device, optical scanner, and a magnetic stripe reader. A registration module in communication with the central processor is used to issue credentials for a person requiring access and also to store identifier data for the person in the database. The registration nodule includes a camera for capturing a digital image of the person, a means for inputting alphanumeric data, a means to retrieve coded electronic data from identification documents, and a means for obtaining a biometric reference from the person. The information forms unique identifier data for the person which is stored in the database.

31 Claims, 5 Drawing Sheets

INFORMATION-BASED ACCESS CONTROL SYSTEM FOR SEA PORT TERMINALS

FIELD OF THE INVENTION

This invention is related to the field of security systems for sea port terminals, and more in particular to an information-based system utilizing biometric data for the purposes of monitoring and controlling personnel access.

BACKGROUND OF THE INVENTION

Maritime commerce is absolutely essential to the viability of the United States economy. More than 95% of our foreign trade passes through our nation's 361 sea ports. Unfortunately, the majority of these ports and the ships that use them are quite susceptible to terrorist attacks that could result in massive loss of life and significant economic disruption. In addition, ports are also the location of considerable drug trafficking, illegal immigration and cargo theft.

In response to the increased threats to maritime commerce posed by terrorism and other criminal activities, the International Maritime Organization (IMO) adopted various amendments in December of 2002 to the Safety of Life at Sea Convention. These amendments, known as the International Ship and Port-Facility Security (ISPS) Code, now have the sanction of the International Community and will have the force of law in the United States upon their effective date of Jul. 1, 2004. In addition, the United States Congress has passed the Maritime Transportation Security Act (MTSA) of 2002 (46 USC 2101) which was signed into law by the President in November of 2002. This Public Law serves as a compliment to the ISPS Code adopted by the IMO one month later.

Two weeks after the ISPS code was adopted by the IMO, the United States Attorney General's Data Management Improvement Act Task Force published its first annual report to the Congress. The Task Force was created to evaluate how the flow of traffic at United States airports, seaports and land border ports-of-entry can be improved while enhancing security, improving coordination between agencies and governments, and implementing systems for data collection and data sharing. The Task Force's first report focuses primarily on recommendations for an entry/exit system for personnel and cargo into and out of United States seaports.

The ISPS code, the MTSA and the Task Force report all mandate or otherwise recommend that all seaports in the United States and all ships using such ports adhere to a number of security-related requirements and to use automation and biometrics as a means to facilitate such security without unduly affecting the flow of commerce. Those requirements include a uniform, comprehensive system of identification of ship crew members (seafarers), a means to identify current passengers, a means to identify port facility personnel, a means to identify legitimate port contractors and other visitors, the issuance or recognition of permanent and temporary passes, positive control of personnel and vehicle access to restricted areas, checking and verification of cargo documentation, prevention of cargo theft and tampering, and inventory control of cargo.

Thus, what is now needed is a fully integrated system for automation of sea port security operations that integrates the collection of personnel data for all persons and vehicles entering a port, the collection of ship, vehicle and cargo tracking information, and the authentication of various identification, registration, and manifest documents. Such as system should also screen all personnel and cargo data for discrepancies that indicate fraud, theft, or a threat. The system as proposed herein is intended to dramatically facilitate improvements in maritime security while at the same time minimizing the effects of such security improvements on the normal flow of maritime commerce.

SUMMARY OF THE INVENTION

It is an objective of the invention to provide an access control system for sea ports which automates that the collection of personnel data for all persons entering a port and provides a networked database for storing the data.

It is another objective to provide an access control system for sea ports which automates the generation of tracking reports for all persons, ships, vehicles and cargo passing through the port.

It is still another objective to provide an access control system for sea ports which utilizes biometric data for security and access control.

It is still another objective to provide an access control system for sea ports which utilizes biometric data stored on a smart card which can be verified at security checkpoints.

It is a further objective of the invention to provide access control system for sea ports which includes equipment operable to retrieve coded information from the magnetic stripe on a drivers license, and which is also networked with government motor vehicle databases so that the authenticity of a drivers license document can be automatically authorized.

It is yet a further objective of the invention to provide an objective of the invention to provide an access control system for sea ports which is networked with the National Criminal Information Center to automatically preform a criminal background check on individuals entering a sea port.

It is still a further objective of the invention to provide an access control system for sea ports which automatically and continuously monitors the database of the National Criminal Information Center for information relevant to persons registered in the sea port database.

It is still another objective of the invention to provide an access control system for sea ports which includes a central database in bidirectional communication with government law enforcement databases.

It is still another objective to provide an access control system for sea ports which is integrated with a national database for investigative and reporting purposes.

It is still another objective to provide an access control system for sea ports which has a fully integrated system for monitoring vehicular traffic in the sea port.

In accordance with the above objectives, an information-based access control system for sea port terminal personnel and vehicles comprises a plurality of security checkpoints at located at entrance portals within the sea port terminal which are in networked communication with a central processor. A database is associated with the processor either locally or on site, or at a central location where it is accessible from a plurality of sea ports. The security checkpoints can be manned stations or unmanned physical barriers, and can include a smart card reader, a device for collecting biometric data from an individual, an optical scanner operable to read information in a bar code format, and a magnetic stripe reader.

Access control and tracking of individuals issued Seaport Identification (ID) cards or ship crew cards, will be accomplished utilizing Smart Card, Proximity Card and/or Bar Code reading technologies. Each of these technologies will permit biometric verification of individual identity and automatic recording of all entries and exits from controlled access areas in a seaport, and on and off ships. A registration module in communication with the central processor is used to issue sea port credentials for a person requiring access and also to store identifier data for the person in the database. A hierarchal security level can be assigned to the person, wherein the security level is associated with access to designated areas within the plurality of sea port terminals. A means to selectively assign permitted access areas to an individual at the time of registration can also be included. The registration module includes a means to capture a digital image of the person, a means for inputting alphanumeric data associated with the person, a means to retrieve coded electronic data from government-issued identification documents, such as a drivers licenses or passports, and a means for obtaining a biometric reference from the person. The biometric reference can be a fingerprint, facial recognition, or hand geometry. The digital image, alphanumeric data, biometric sample, and coded electronic data form the government-issued identification document form unique identifier data for the person which is stored in the database. Access permission is then validated means wherein a positive permission or negative permission for the person is returned. In order to validate access permission, a communication means is provided which is operable to access government databases associated with the government-issued identification documents to validate the authenticity of the document by verification of the coded electronic data thereon. A further communication means operable to access the National Criminal Identification Center (NCC) database is provided in order to perform an instantaneous background check based on the government-issued identification document. If either or both of these background checks are negative, a "deny entry" status is assigned to the person, and if appropriate, law enforcement authorities are surreptitiously notified. The NCC database is then preferably continuously queried with regard to the status of individuals listed in the sea port database, and a deny entry status is then assigned to the identifier data of a person in response to a negative background check.

If a positive permission is returned, credentials for the person are printed on portable media to be used as an access pass. The access pass is preferably in card form, and includes the digital image of the person in a visible format and alphanumeric data associated with the person. The identifier data can also be included in a machine readable format, such as a bar code or a magnetic stripe. The access pass can be in the form of a smart card which includes the biometric reference and other data for the person stored in electronic format on a microprocessor embedded on the smart card. The smart card can include other security features to prevent fraudulent use, such as a hologram security layer. For temporary visitors, a temporary badge can be printed on adhesive paper which includes the printed digital image of the person and a bar code symbology.

A processing means is coupled to the plurality of security checkpoints, the processing means operable to perform the steps of: retrieving the biometric data from the smart card to determine if a match exists between data obtained with the biometric reader, querying the database to determine if the person is authorized for access, recording chronological parameters associated with entry, and storing the chronological parameters in the database to create a tracking record for the person.

In a preferred method of the invention, the security checkpoints at the entrance portals of plurality of maritime sea ports are networked to a central database to implement an information-based access control system for human personnel and vehicular traffic within each sea port terminal. The central database can be in bi-directional communication with government law enforcement agency databases.

Registered commercial vehicles will gain relatively rapid access to controlled access areas through use of Radio Frequency Identification (RFI) transponders or vehicle bar codes. Such vehicular access control technologies, when combined with the intelligent card technologies of access card issued to commercial drivers will permit rapid ingress and egress of commercial vehicles, their drivers and cargo thus speeding the flow of commerce without sacrificing the access control and tracking so necessary to security. All containerized cargo will be tracked by electronic manifest using container transponders and/or container bar codes to track the movement of all containers in the port to include arrival and departure by ship or vehicle.

In the preferred embodiment, a network operations center is established in each seaport to provide the port and appropriate government authorities with the information required to assure the safe and lawful flow of persons, vehicles and cargo into and out of the port. All seaport personnel and vehicle entry and exit activity, all crew entry and exit activity, all semipermanent identification card and visitor records, all vehicular registration information and all cargo information can be reported to the network operations center on and almost real time basis. The network operations center will process all information as it arrives to automatically alert operations personnel to any access control or cargo tracking problems. In addition, the network operations center will update the database at the state or regional level at periodic intervals. The database can be used also for investigative purposes and to generate all enterprise level and seaport level reports required by federal, state and local government agencies. The network operations center will normally also serve as a port emergency operations center for any security or disaster related incident at the port.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

The "front end" processes of the preferred embodiment of the invention, which includes data collection, employee/crew badging, visitor control, vehicle/cargo tracking and database management, is an enhanced version of an existing hardware and software integration for visitor access control disclosed in U.S. Pat. No. 6,394,356, the disclosure of which is herein incorporated by reference.

The addition of various electronic fingerprint scan technology has been incorporated into the system in order to insure identification authentication and to aid in forensic investigations. It is within the scope of the present invention that other biometric technologies can be used for identification purposes (facial recognition, hand geometry, etc.) as appropriate by the simple use of standard application programming Interfaces (API) and Dynamic Link Libraries (DLL) communications protocols with the device selected.

Figure 1:
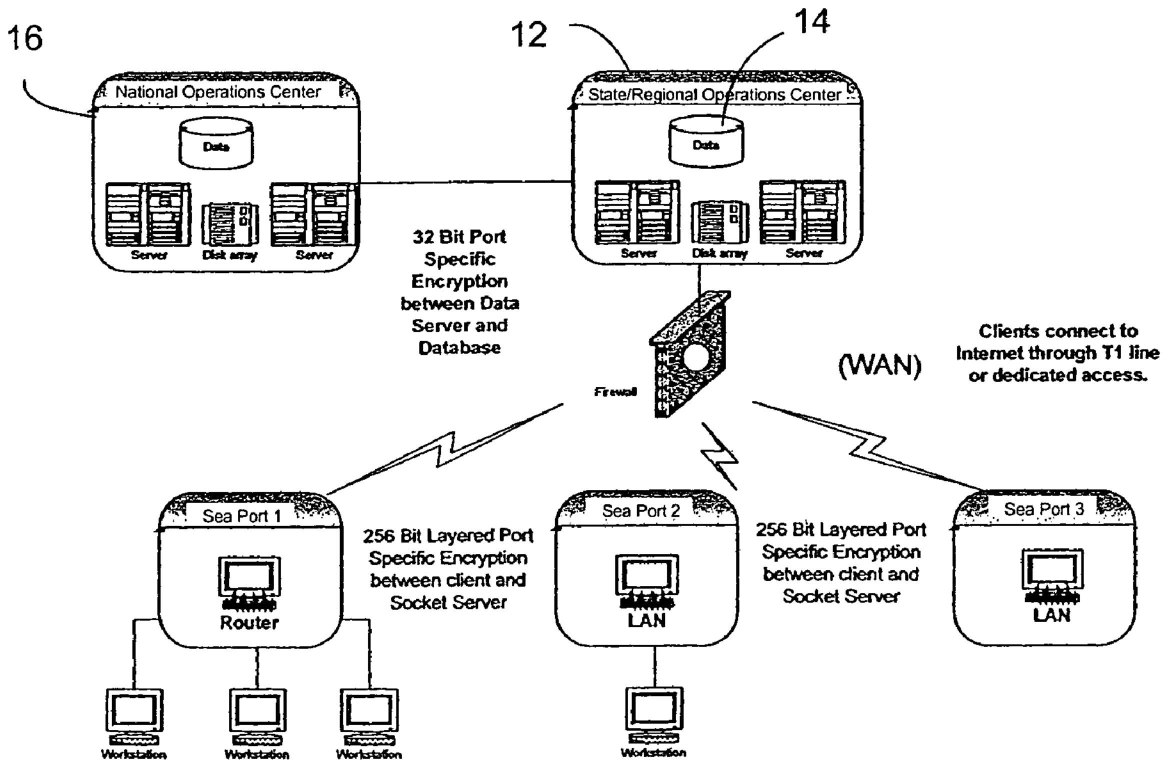
FIG. 1 is a schematic illustration of an example of the overall system in a preferred embodiment.

In accordance with a preferred embodiment of the invention, a networked communication environment inclusive of a plurality of maritime sea ports serves to implement an information-based access control system for human personnel and vehicular traffic within sea port terminals. The system of the invention utilizes a relational database storage mechanism designed to run in a client/server environment over an Ethernet topology. FIG. 1 schematically illustrates an example of the overall system in which a plurality of sea ports are coupled to a state/regional operations center server 12 via the Internet through a T1 line or dedicated access. The state/regional operations center 12 includes a central database 14. As shown in the example, the system is a hierarchal arrangement where a plurality of state/regional operations center 12 are similarly coupled to a national operations center 16. The system uses a middle tier architecture that listens for the client command and communicates to a central database server. All state/regional and national database connectivity is via proprietary servers. The application has been designed in a modular fashion to accommodate optional features and scalability. This architecture ensures enterprise level operation to each of the individual seaports.

Each seaport will be surveyed to ascertain what existing infrastructure exists at proposed secure areas, checkpoints and administration areas. Information gathered during the survey phase such as commercial traffic volumes, numbers of visitors and on site personnel would be reviewed to determine how many client workstations and supporting servers would be required for each port.

Several layers of encryption are used to ensure the safe transmission of data over the network or the Internet. The highest layer, which applies to all data transmitted, is encrypted using one of the most secure algorithms commercially available at 128 bit. This safeguards all data and prevents tampering. In addition a different, but equally secure, algorithm is used to lock down certain key pieces of information in the database itself at 32 bit. The database is secured from unauthorized access by using a different scheme managed internally on the database server.

Prior to any encryption, all data is compressed before it is transmitted over the network. This compression is based on standard Huffinan encoding techniques and provides high compression on this type of data. This enhances speed considerably and assists with keeping network traffic and overhead low.

A plurality of security checkpoints at located at entrance portals within each of the plurality of sea port terminals are provided, wherein said security checkpoints are in networked communication with a local processors at the sea port terminal. Established checkpoints will enable the guard to monitor whether an individual and/or vehicle is authorized for entry. The instrument required for entry is an access pass produced in accordance with the present invention, which will be discussed in detail hereinafter.

Standard equipment for the checkpoints include a networked PC with monitor, a smart card reader, a bar code reader, and a biometric reading device. The checkpoints can be customized to display to the guard the issuing seaport, date, time and the information regarding destination and authorizations upon the reading of the card/pass. The photo of the person and expiration date of the access pass can be added to the customized display. Additionally, permanent cardholders will have unique identifying marks on their access passes to provide a visual cue to the checkpoint guards. Unmanned portals or secure areas can be designed to control entry without the presence of a guard. Such entry points may or may not be under remote observation. Examples of these unmanned portals include “man trap” turnstiles with either a biometrics reader or CCTV monitoring and vehicle gates controlled by RF transponders/employee badges/bar codes.

All checkpoints are required to have network connectivity and adequate electrical service. Random checkpoints can be utilized where wireless connectivity is enabled. Access points and wireless bridges conforming to the IEEE 802.11 standard can be designed into the infrastructure to provide remote authorization requests. Any wireless nodes will utilize WEP (Wired Equivalent Privacy) safeguards for encryption purposes.

A registration module is provided to issue seaport credentials to individuals requiring access to the sea port terminal. Registration can be accomplished at a standardized registration station which can include a networked PC, a digital camera, a document reader, a visitor pass printer, a device to read encoded data on government issued documents, an access card printer/encoder, a biometric device (such as a fingerprint capture device) and a vehicle pass printer. The system provides the ability to capture digital images of seaport employees, vendors, contractors or any person requiring a semipermanent badge. This system will store the applicant’s information in the central database. Each applicant will have their vital information, including but not limited to; name, picture, address, fingerprints, government ID (passport or drivers license image), company, vehicle registration, ID expiration date and issuing seaport input into the database during the credentialing phase.

Figure 2:
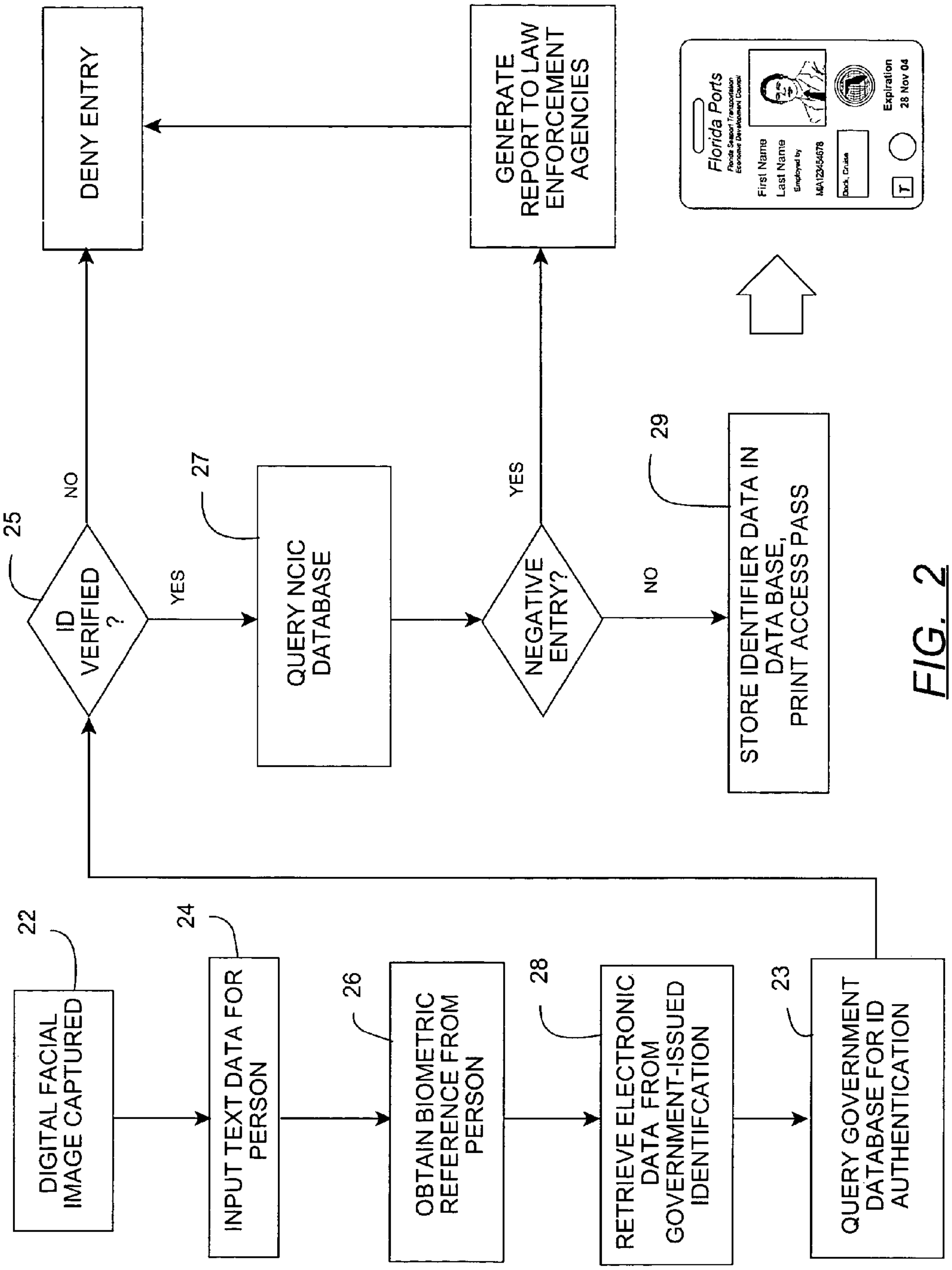
FIG. 2 illustrates the steps for registering a person authorized for access into the sea port terminal.

FIG. 2 illustrates the steps for registering a person authorized for access into the sea port terminal. In step 22, a digital camera captures a digital image of the person. Using a keyboard or other data entry means, alphanumeric data associated with the person can be input at step 24. A biometric device then captures a biometric reference from the person 26. In the preferred embodiment, fingerprint technology is used. Capturing the person’s fingerprints is compliant with AFIS (Automated Fingerprint Identification System) standards and compliant minutiae extraction and storage methodologies. The extracted data can be easily exchanged across jurisdictional lines and complied with the ANSI/NIST-ITL1-2000 (National Institute of Standards and Technology) Data format for the interchange of Fingerprint Information.

Definitive identity is established for the person using at least one government-issued identification document, such as a drivers license or passport. The registration means includes a means for retrieving coded electronic data from government-issued identification documents issued to the person (step 28). The digital image, alphanumeric data, biometric reference, and coded electronic data from the drivers license and/or passport are then stored as identifier data for the person in the database.

The authenticity of the government-issued identification document is verified by accessing the government database associated with the document to validate the coded electronic data thereon (step 23). A deny entry status is issued if the government-issued identification document cannot be validated (step 25). Validation of the applicant driver’s license is performed utilizing AAMVA (American Association of Motor Vehicle Administrators) derived templates. These templates represent the United States and Canadian provinces that utilize either a magnetic stripe or bar codes (1D and 2D) in their license. Templates are also available for validation of U.S. military identification.

The central database includes a communications link with the National Criminal Identification Center (NCIC) database. During the registration process, the NCIC database is queried for information relevant to the person identified by the identification documents. A report is generated if relevant data is located in the NCIC database, and a deny entry status may be issued. These document validation and authorization tools facilitate the requisite background checks that need to be performed on each applicant. Registered individuals will continue to have background checks made against the NCIC database.

Based on the background checks, a positive or negative entry permission is assigned to the individual, and an access pass is issued. The access pass can be in the form of a badge worn by the individual. In the preferred embodiment, the access can be a so-called smart card having data storage capacity. For visitors or other temporary personnel, access passes can be printed on adhesive-backed paper. The access pass preferably has a visible image of the person printed thereon and at least a portion of the identifier data printed thereon in human readable format. The biometric reference for the person can be stored in the microprocessor embedded on the smart card, as well as other identifier data.

Figure 3:
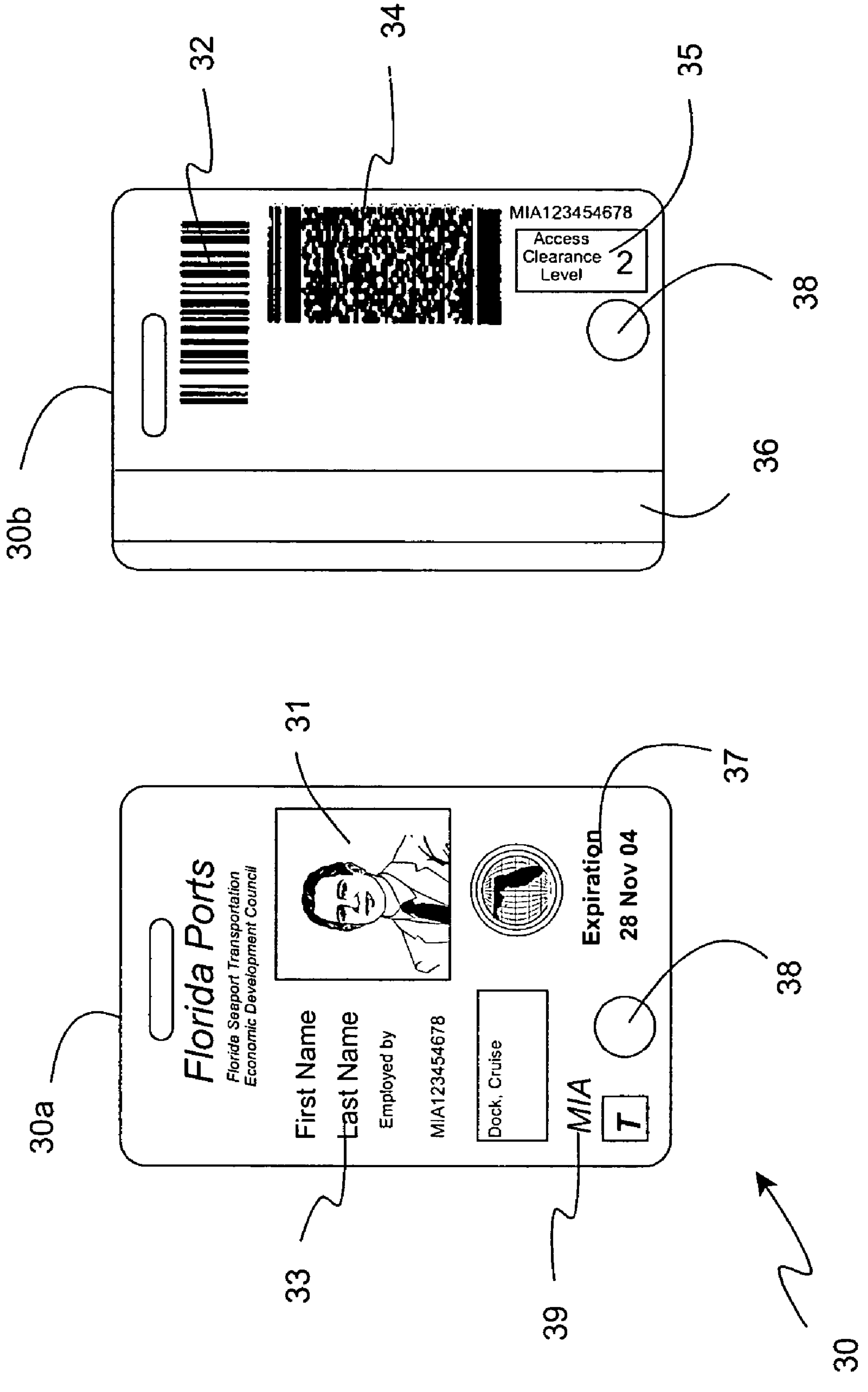
FIG. 3 illustrates an example of an access card having smart card features.

FIG. 3 illustrates the front 30*a* and back 30*b* of an exemplary access card 30 according to the invention. Access cards can be color coded to identify the issuing port, and unique holograms or watermark logos can be added to ensure authenticity. The access card 30 includes the photo of the individual 31 (from the digital image file stored in the database), that person's name 33, individual access level 35, the expiration date of the card 37, and issuing seaport 39. The access card 30 includes symbology in the form of bar codes 32 and 34 that can be read by hand held or fixed mount readers at various established check points at all ports. The card also includes identifier data stored in the magnetic strip 36. The smart chip 38 can be a contact chip readable by a contact chip reader, or a contactless chip having an antenna disposed therein for remote reading. The chip 38 can store a reference biometric (such as right index fingerprint minutia) for instant electronic verification, as well as a PKI digital certificate for logical access and electronic signatures. The smart cards used will in accordance with the invention conform to the Government Smart Card Interoperability Specification Version 2.0. A standard data model in the chip conforms to the GSA IS Interoperability Specification, and has 57 mandatory data elements defined. The card will use a JAVA 32K EEPROM, open platform compliant; FIPS 140 level 2 security chip.

The system allows for multiple custom Employee ID Cards, Contractor ID Cards, Visitor and Vehicle Passes based on definitions and design criteria established by the seaport or a government authority and will support multiple data encoding and reading technologies (Magnetic stripe, 2D bar code and Smart Card) that can be read and validate the card, both on or off line at fixed gate check points or remote mobile check stations. At each security checkpoint, a processing means is operable to perform the steps of: retrieving biometric data from the smart card to determine if a match exists with data obtained with the biometric reader, querying the database to determine if the person is authorized for access, recording chronological parameters associated with entry, and storing the chronological parameters in the database to create a tracking record for the person.

Access cards that have been declared lost or have passed their expiration date will automatically trigger an alarm when used at any seaport checkpoint thus alerting the guard to its unauthorized use. Renewal or replacement of valid cards will render the earlier card "inactive." Renewal of previously issued cards can be performed without the applicants' presence (if required). The status of the issued access cards can be changed from "active" to "deny entry" by authorized personnel. The database record will reflect this change. When the ID card is read at the seaport entrance, the status query will alert the seaport guard that the cardholder is no longer allowed access to the facility. The guard then can confiscate the card from the individual and deny him or her entry.

Entry checkpoints will be utilized to process card-carrying personnel. Each card is recorded and checked for authorization at any controlled area. "Deny entry" functionality checks are performed during these checkpoints, as well as, the visitor registration process. If a database record has been identified as "deny entry," any visitor attempting to enter with that name will trigger an alert notification to the operator. In the event that the "deny entry" alert is false, the operator has a manual override capability. This capability exists for all persons attempting entry to the seaport. If an employee, contractor or vendor has a "deny entry" flag attached to their database record, an alert will notify the guard to refuse entry or alert law enforcement personnel as appropriate.

All activity is recorded and posted to the database regarding entry, exits, authorization checks, etc. These records will be maintained for as long as required, then archived out (no earlier than 90 days). Upon such time as the database will be archived, the visitor records and activities can be downloaded to a storage media (CD, tape). Permanent records (such as that for employees, vendors and contractors) are never archived out of the system.

In the practice of the invention, ships and/or shipping companies entering the sea port will be responsible for collecting biographic and fingerprint data on all ship crew members and issuing crew identification cards that are compliant with International Maritime Organization (IMO) and United States Coast Guard (USCG) standards. Such identification cards must be issued to crew members prior to arrival in a United States port and the ship issuing such cards shall transmit to a United States arrival port all crew information maintained in the ship database no more than thirty-six (36 hours) and no later than twenty-four (24) hours prior to arrival. For cruise ships, such transmission may include only updates if such port is visited more than twice each month for at least a contiguous two month period of time.

The crew biographic, fingerprint and badging system will be capable of collecting, at a minimum, the following information: name, date of birth, sex, employer, nationality, passport number, digital facial photo, electronic fingerprint data, and crew certifications. Validation of the crew member's passport is performed using templates derived from international passport standards. The system will alert the ship operator if a passport been altered or tampered with. This technology utilizes refractive light, holograms, ink sensitivity and check sum algorithms to insure that a passport is authentic. The crew member's right index fingerprint file will be compliant with the United States Federal Bureau of Investigation (FBI), AFIS (Automated Fingerprint Identification System) standards. Capturing the crew member's right index fingerprint will be accomplished with a device capable of a full 500 dots per inch (DPI) image capture.

Any crew member wishing to disembark a ship must pass through a manned check point with a networked bar code and fingerprint reader. The system will cross reference the crewman's right index fingerprint with the right index fingerprint stored in the central database. After verification, the user is authorized to leave ship side area. Crew members may pass through various control check points and access points in and out of the port where verification may also be accomplished. In addition, patrols will have wireless verification devices that can check identities of crew members in seconds. All verifications are automatically recorded by date, time, and place in an activity log associated with the crew member's database record. Any crew member failing verification at any location and time will be investigated to determine his or her correct status by port security personnel.

Passengers traveling on a cargo vessel must be credentialed by the ship upon first boarding the ship. If a passenger is embarking on a ship at a United States port, prior communication must be made between the ship/ship company and the port in order for the passenger to be allowed to join the ship at pier-side. The port will credential the individual as a port visitor and the ship will credential the individual as a passenger upon boarding. Credentialing of passengers will include, at a minimum, the following: names, sex, date of birth, nationality, passport number, passport expiration date, home address, right index fingerprint, facial photo and an image of passport. Passengers on board cargo ships will be reported to an arriving port in the same manner as crew but with the designation of passenger. Passengers will also be spot checked in the same manner as crew at the various threat levels. In addition, all cargo ships will report all new joining passengers to the database as soon after credentialing aboard ship as possible.

In the practice of the invention, ships will be responsible for declaring ship visitors to the port in advance of a visit. A ship visitor must first report to the port visitor registration point for credentialing and a temporary port pass before proceeding to the ship. Upon arriving at the ship, the visitor will receive a temporary ship pass. The port will collect the following information upon issuing a temporary visitor pass: name, date of birth, sex, employer, nationality, passport number/driver's license number, expiration date, passport/driver's license scan image, digital facial photo, and right index fingerprint. Any individual who has reason to visit a port more than five times in ninety (90) days, must obtain a semipermanent port identification badge. After obtaining either a temporary pass or a permanent identification badge, the visitor must travel to the appropriate pier and perhaps pass through one or more manned security gate(s). At any gate, the visitor will have his badge scanned and his right index finger scanned and authenticated against the information in the database. If the visitor is authenticated, he may proceed to the ship. However, if he is denied entry, the visitor will be investigated by port security personnel to determine his or her status. The visitor registration process will be customized to perform the 90-day frequency check. Repeat visitors to the seaport during that duration will be counted and logged. This search of activity during the "floating" window of time will be dynamic and will not require any operator intervention. Visitors that exceed the 5-time frequency threshold will be instructed to get a semi permanent badge.

The system of the invention can accommodate the input of vehicle information into the database record of both the driver and passenger(s). The capturing of the vehicle registration image will be scanned into the database at the registration module. Available database fields include the vehicle tag number and issuing state. This vehicle information will be associated with both the driver and their respective vehicle passengers. As the visitors are being registered, their vehicle information will be processed as part of the database record.

Figure 4:
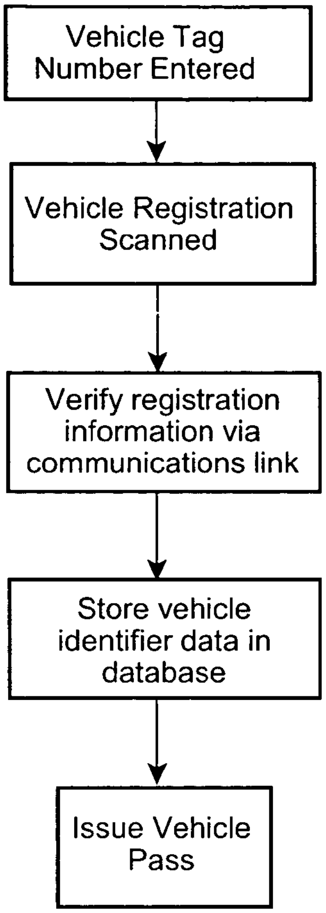
FIG. 4 illustrates the steps of the process of registering a vehicle and generating a vehicle access pass according to preferred embodiment.

Custom designed vehicle visitor passes can be created to visually display to what areas the vehicle is authorized access. The system allows any Windows compatible printer to be utilized. This gives the sea port a number of printing options including color-coding, adhesive decals or custom display options. Vehicle passes will have a bar code font that can be read through a windshield. Expiration dates will be included on the vehicle pass to preclude re-use. FIG. 4 illustrates the process of generating a vehicle pass.

The system will utilize a visitor badging software solution that will capture a picture of the visitor, scan and authenticate their identification, take their right index fingerprint and provide a pass within 30 seconds. A visitor's drivers' license or passport will be authenticated in the same manner described above for employee badging. These devices possess OCR (Optical Character Recognition) abilities and magnetic stripe parsing technology that will aid the operator in the data entry. All visitor history will be queried to determine if a person has visited the seaport more then 5 times in the last 90 days. If the visitor has exceeded that threshold, they will be instructed to apply for a semipermanent identification. In addition to having the picture displayed and authorized areas annotated, the passes will have bar code symbology printed on them to allow for checkpoint screenings and port exit validation. Bar code readers used at these egress points can be handheld or mounted.

Figure 5:
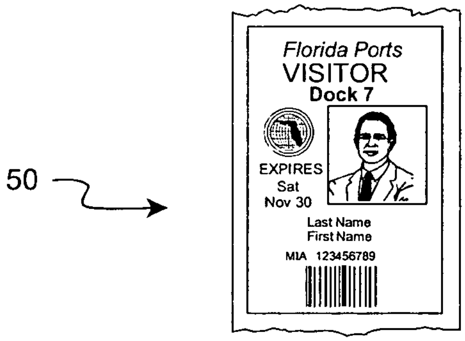
FIG. 5 illustrates an example of a visitor pass.

Visitor passes can be printed on a variety of media. An example of a visitor pass 50 is shown in FIG. 5. Paper stock, PVC, Teslin and adhesive labels are available. The adhesive backed labels provide an economical solution for high volume seaports. Even with a relatively inexpensive thermal printer, 300 DPI quality facial images can be printed on the visitor pass.

After successful authentication of the visitor, their record will be input into the database. In the event that an individual's license or passport is found to be fraudulent, the system will alert the operator. This record will then be classified as a "deny entry" to preclude future attempts at entry.

This "deny entry" capability will alert the registration guard to a suspicious record when encountered. These "deny entry" flags can be imported from a variety of sources including "watch" lists. The system has the capability to allow the manual override of the "deny entry" record when enabled. This is used where identical names may be in the system, one being the legitimate visitor and the other a bona fide member of a watch list.

Convenient tools are provided to speed up the processing of port visitors. One attribute is the "return visitor" function that will display pictures from the database of persons with the same name. The operator can choose to accept the displayed record thereby minimizing the amount of data entry that needs to be performed. Another convenience is the "pre approval ability;" this allows authorized port employees and ships to register expected visitors ahead of time. This module also precludes unauthorized entrance to the seaport by persons not on the "approved" list.

Employee records can be automatically imported into the system database to facilitate the visitor processing. This feature allows the administrator to group employee departments or authorization levels as needed. These groups then can be afforded differing security levels and visitation privileges. All activity for an individual pass is readily accessed. This visitor information will reside on the database server and will be available to the state/regional and national database systems via a distributed environment. Custom reports can be created utilizing the report generator that is bundled with the software suite. Individual records of visitors, locations, and frequencies can be derived from these reports.

Figure 6:
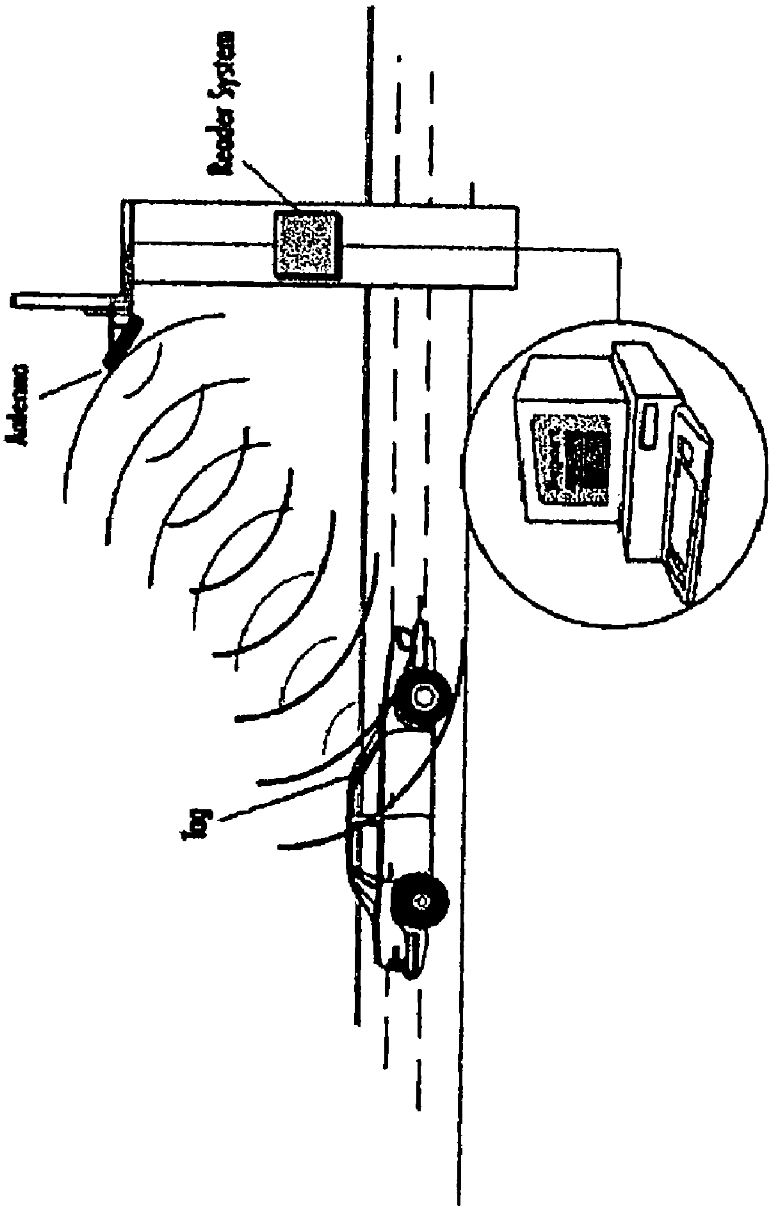
FIG. 6 illustrates the use of a RF transponder on a commercial vehicle.

The invention includes a system for tracking commercial vehicles within the sea ports. In the preferred embodiment the system has two options available to automatically identify vehicles. One option is to utilize RFID (Radio Frequency Identification) transponders as shown in FIG. 6. These devices emit a unique identification code that is received by fixed antennae. This unique code ties the vehicle to a database record. The entry and exit of vehicles utilizing this transponder technology preclude the owner from having to physically scan out the vehicle. A second option would be to have bar code decals affixed to the vehicles. A fixed mount bar code reader can be employed to read the truck's bar code when it pulls up to the guard gate. The bar code number will correspond to a database record that has all of the carrier information. Readers will be erected at entry and egress points for commercial trucks. Vehicles that do not employ the automated system will be subject to a manual check in/check out process. To preclude delays in commerce, a dedicated area will be required to segregate these vehicles requiring manual checks from the automated lane(s). The bar code option will utilize readers that are placed at the appropriate height of the truck cab. Readers have a range of up to six feet. The bar code decals can be easily applied during the registration process for an economical solution.

The RFID option would include RF receivers and Demodulators arranged in a daisy chain network structure. Each commercial vehicle requiring registration will be outfitted with an electronic "tag." This tag has the ability to transmit up to 64 bytes of data. At a minimum, the essential vehicle data will contain the carrier's identifying information as well as specific vehicle information.

Adequate fail over, data replication and redundancies can be designed into the system of the invention. Anticipated hardware needs include clustered servers for load balancing and fail over, external storage arrays and high speed SCSI hard drives. The 3 million current record requirement will entail storage devices in excess of 100 Gigabytes.

The system of the inventions designed to communicate with ancillary databases such as Customs, Immigration and FBI for the purposes of sharing information. Importing of information from outside Government Agencies can be easily accomplished utilizing the system's import tool. Desired frequencies for the export/import process can be established to provide automatic updating of critical records. This functionality will enable the owner to have current "deny entry" status assigned to various watch lists and "most wanted" manifests.

The system will have a custom report generator bundled with the application. This tool will allow the owner to create custom reports based on the current data in the database. Data mining of records in the database will allow the owner the ability to investigate any area of interest as it pertains to seaport access control. All persons that have had ID cards, visitor passes or "deny entry" activities recorded will be able to be sorted and reported on. All information that was scanned into the system, including photos, vehicle registrations, fingerprint and identifications will be viewable. Additionally, any demographic or personal information regarding companies, physical descriptions or specific seaport activities can be reported. All report activities will show the time of entry and exit and, at a minimum, contain the individual's photo, ID and any additional data that is warranted.

Records that have been archived out of the system will be accessible utilizing a custom viewer application. This enables historical data to be reviewed for investigative reports and history. Any storage medium can be utilized to archive and view the historical records.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. An information-based access control system for sea port terminal personnel, comprising:

a plurality of security checkpoints at located at entrance portals within the sea port terminal, wherein said security checkpoints are in networked communication with a central processor, each of said security checkpoints including a smart card reader and a device for collecting biometric data from an individual;

a database associated with said central processor, a registration module in communication with said central processor for issuing sea port credentials for a person requiring access, wherein said registration means is operable to store identifier data for the person in said database, said registration means including:

means to capture a digital image of the person;

means for inputting alphanumeric data associated with the person;

means to retrieve coded electronic data from government-issued identification documents;

means for obtaining a biometric reference from the person;

wherein said digital image, alphanumeric data, biometric reference, and coded electronic data form the government issued identification document form identifier data for the person;

validation means wherein a positive permission or negative permission for the person is returned, said validation means including:

communication means operable to access government databases associated with the government-issued identification documents to validate the authenticity of the document by verification of the coded electronic data thereon; and communication means operable to access the National Criminal Identification Center (NCIC) database in order to perform an instantaneous background check based on the government-issued identification document; and means to produce credentials on portable media if a positive permission is returned;

a smart card specific to a person having access permission wherein at least a portion of said identifier data for the person is stored on a microprocessor embedded on the smart card, said smart card further including the digital image of the person in a visible format and alphanumeric data associated with the person; and processing means coupled to said plurality of security checkpoints, said processing means operable to perform the steps of: retrieving said biometric data from said smart card to determine if a match exists with data obtained with said biometric reader, querying the database to determine if the person is authorized for access, recording chronological parameters associated with entry, and storing said chronological parameters in said database to create a tracking record for the person.

2. The system of claim 1, wherein said registration module further includes a means to selectively assign permitted access areas to a individual.

3. The system of claim 1, wherein said identifier data further includes vehicle registration data.

4. The system of claim 1, wherein said smart card further includes machine readable symbology containing said at least a portion of said identifier data.

5. The system of claim 4, wherein said machine readable symbology is a bar code, and said plurality of security checkpoints each include bar code readers.

6. The system of claim 1, wherein said smart card further includes a machine readable magnetic strip containing said at least a portion of said identifier data in electronic format, and said plurality of security checkpoints each include magnetic strip readers.

7. The system of claim 1, wherein said smart card further includes a hologram security layer.

8. The system of claim 1, wherein said smart card includes a contact chip, and said smart card reader is a contact smart card reader.

9. The system of claim 1, wherein said smart card includes a contactless chip having an antenna embedded therein, and said smart card reader is a contactless smart card reader.

10. The system of claim 1, wherein said biometric reference is a fingerprint.

11. The system of claim 1, wherein said biometric reference is facial recognition.

12. The system of claim 1, wherein said biometric reference is hand geometry.

13. The system of claim 1, further comprising a means to continuously query the NCIC database for background check information.

14. The system of claim 13, further comprising a means to assign a deny entry status to the identifier data of a person in response to a negative background check.

15. The system of claim 1, wherein said security checkpoint is a manned guard station.

16. The system of claim 1, wherein said security checkpoint is an unmanned physical barrier.

17. An information-based access control system for sea port terminal personnel and vehicular traffic within the sea port terminal, comprising:

a plurality of security checkpoints at located at entrance portals within the sea port terminal, wherein said security checkpoints are in networked communication with a central processor, each of said security checkpoints including a means to retrieve machine-readable data from media presented at the security checkpoint from a person seeking access;

a database associated with said central processor, a registration module in communication with said central processor for issuing sea port credentials for a person requiring access, wherein said registration means is operable to store identifier data for the person in said database, said registration means including:

means to capture a digital image of the person;

means for inputting alphanumeric data associated with the person;

means to retrieve coded electronic data from government-issued identification documents;

means for obtaining a biometric reference from the person;

wherein said digital image, alphanumeric data, biometric sample, and coded electronic data form the government issued identification document form identifier data for the person;

validation means wherein a positive permission or negative permission for the person is returned, said validation means including:

communication means operable to access government databases associated with the government-issued identification documents to validate the authenticity of the document by verification of the coded electronic data thereon; and communication means operable to access the National Criminal Identification Center (NCIC) database in order to perform an instantaneous background check based on the government-issued identification document; and printing means to produce an access pass on portable media if a positive permission is returned, said access pass including the digital image of the person in a visible format and at least a portion of said identifier data in machine-readable format; and processing means coupled to said plurality of security checkpoints, said processing means operable to perform the steps of: retrieving said identifier data from said access pass, retrieving said biometric data corresponding to said identifier data from said database to determine if a match exists wotj data obtained with said biometric reader, querying the database to determine if the person is authorized for access, recording chronological parameters associated with entry, and storing said chronological parameters in said database to create a tracking record for the person.

18. The system of claim 17, wherein said means to retrieve machine readable data is an optical scanner.

19. The system of claim 17, wherein at least a portion of said identifier data is stored on said access pass in bar code format, and said means to retrieve machine readable data is a bar code reader.

20. The system of claim 17, wherein said means to retrieve machine readable data is a magnetic stripe reader, and at least a portion of said identifier data is stored on said access pass in a magnetic stripe.

21. The system of claim 17, wherein said registration means further includes a means to selectively assign permitted access areas to a individual.

22. The system of claim 17, wherein said biometric reference is a fingerprint.

23. The system of claim 17, wherein said biometric reference is a facial image.

24. The system of claim 17, wherein said biometric reference is hand geometry.

25. The system of claim 17, further comprising a means to continuously query the NCIC database for background check information.

26. The system of claim 25, further comprising a means to assign a deny entry status to the identifier data of a person in response to a negative background check.

27. The system of claim 17, further comprising a vehicle registration module in communication with said central processor, said vehicle registration comprising:

means to input the state-issued vehicle tag number of a vehicle to be registered;

scanning means to produce a digital image of the vehicle registration document;

communication means operable to access government databases associated with the vehicle registration to validate the authenticity of the vehicle registration;

means to store identification information for the vehicle in said database, and printing means to produce an vehicle access pass on adhesive paper, said access pass including vehicle identification information in bar code form.

28. The system of claim 27, further comprising a processing means coupled to said plurality of security checkpoints, said processing means operable to perform the steps of: retrieving said vehicle identification data from said vehicle access pass, querying the database to determine if the vehicle is authorized for access, recording chronological parameters associated with entry, and storing said chronological parameters in said database to create a tracking record for the vehicle.

29. The system of claim 27, further comprising:

a plurality of security checkpoints for vehicular traffic, said security checkpoints including a physical barrier for vehicular traffic;

RF receivers at each of said security checkpoints, said RF receivers in communication with said central database; and a RFID transponder attachable to a vehicle, wherein said RF transponder is operable to transmit said vehicle identification information.

30. A method for providing a networked communication environment inclusive of a plurality of maritime sea ports to implement an information-based access control system for human personnel and vehicular traffic within a sea port terminal, comprising:

providing a central database in communication with the plurality of sea ports;

providing a plurality of security checkpoints at located at entrance portals within each of the plurality of sea port terminals, wherein the security checkpoints are in networked communication with a local processor at the sea port terminal, providing a device for collecting biometric data from a person seeking access at each of the security checkpoints;

providing a smart card reader at each of the security checkpoints; and registering a person authorized for access into the sea port terminal using the steps of capturing a digital image of the person;

inputting alphanumeric data associated with the person;

capturing a biometric reference from the person;

retrieving coded electronic data from government-issued identification documents issued to the person;

storing the wherein the digital image, alphanumeric data, biometric reference, and coded electronic data from the government-issued identification document as identifier data for the person in the database;

providing a communications link with government databases associated with the government-issued identification document;

verifying the authenticity of the government-issued identification document by accessing the government database associated with the document to validate the coded electronic data thereon;

issuing a deny entry status if the government issued identification document cannot be validated;

providing a communications link with the National Criminal Identification Center (NCIC) database;

querying the NCIC database for information relevant to the person identified by the identification documents;

generating a report if relevant data is located in the NCIC database;

issuing an access pass for a person requiring access using the steps of:

providing a smart card specific to the person having a visible image of the person printed thereon and at least a portion of the identifier data printed thereon in human readable format; and storing the biometric reference for the person in the microprocessor embedded on the smart card.

31. The method of claim 30, further comprising the steps of:

obtaining biometric data from a person seeking access through a security checkpoint;

retrieving the biometric data from the smart card issued to a person access;

determining if a match exists between data obtained with the biometric reader, querying the database to determine if the person is authorized for access, recording chronological parameters associated with entry, and storing the chronological parameters in the database to create a tracking record for the person.

* * * * *